United States Patent [19]
Gonsowski et al.

[11] Patent Number: 5,320,478
[45] Date of Patent: Jun. 14, 1994

[54] PALLETIZING APPARATUS AND METHOD FOR PACKAGED CONTAINERS

[75] Inventors: Thaddeus W. Gonsowski, Osceola, Wis.; Richard Wolfgram, St. Paul, Minn.; Michael Ratajczyk, Minneapolis, Minn.; Dory Kazmierczak, Scandia, Minn.

[73] Assignee: Simplimatic Engineering Company, Lynchburg, Va.

[21] Appl. No.: 945,024

[22] Filed: Sep. 15, 1992

[51] Int. Cl.$^5$ .............................................. B65G 47/24
[52] U.S. Cl. .................................... 414/792; 198/374
[58] Field of Search ................. 198/365, 374; 414/792, 414/786, 792.1

[56] References Cited

U.S. PATENT DOCUMENTS

| | | | |
|---|---|---|---|
| 3,580,379 | 5/1971 | Shuster et al. | 198/374 X |
| 3,627,103 | 12/1971 | Leach | 198/374 |
| 3,677,389 | 7/1972 | Benatar | 198/374 X |
| 3,682,338 | 8/1972 | Von Gal, Jr. et al. | |
| 3,731,782 | 5/1973 | Del Rosso | 198/365 X |
| 3,788,497 | 1/1974 | Carlson | |
| 3,809,254 | 5/1974 | Leach | |
| 4,026,422 | 5/1977 | Leenaards | 414/792 |
| 4,051,949 | 10/1977 | Lapeyre | |
| 4,184,588 | 1/1980 | Lapeyre | |
| 4,724,953 | 2/1988 | Winchester | |
| 4,886,158 | 12/1989 | Lapeyre | |
| 4,893,710 | 1/1990 | Bailey et al. | |
| 5,195,627 | 3/1993 | Wyman | 198/374 |

Primary Examiner—Michael S. Huppert
Assistant Examiner—Janice Krizek
Attorney, Agent, or Firm—St. Onge Steward Johnston & Reens

[57] ABSTRACT

A palletizing apparatus for providing container packages in a desired pattern to a pallet, and related method are presented. The apparatus includes a metering conveyor section which uses a traveling endless belt to feed container packages to a lane forming station; a lane forming station having a lane divider which accepts container packages from the metering conveyor section and separates the container packages such that they are fed to a turning station in a plurality of lanes; a turning station having a turning conveyor using a traveling endless plastic belt made up of individual modules shaped to provide longitudinally oriented upper ribs, which conveys the container packages therealong; turning apparatus for turning container packages by approximately 90°; and bypassing means for bypassing each of the turning apparatus; a collection station having a collection conveyor using a traveling endless plastic belt made up of individual modules shaped to provide longitudinally oriented upper ribs which convey the container packages therealong; a pair of side pushers, one disposed on either side of the collection conveyor such that movement of the side pushers towards each other forces the container packages closer to each other in the transverse direction; a stop bar wherein the stop bar is moveable into position with respect to the collection conveyor such that leading container packages strike the stop bar and subsequent container packages strike the leading container packages and collect against the stop bar; and apparatus for transferring the collected container packages to a pallet.

21 Claims, 10 Drawing Sheets

PALLETIZING APPARATUS AND METHOD FOR PACKAGED CONTAINERS

FIELD OF THE INVENTION

The present invention relates to a palletizer which provides container packages in tiers on a pallet. The packages are provided in a certain desired pattern in each tier in order to facilitate pallet stability.

BACKGROUND OF THE INVENTION

Palletizing apparatus are used to accept containers or packages from a source and load those containers or packages on a pallet for shipment or storage. The objects loaded on the pallet are loaded in several tiers, each tier assuming a specific pattern to maximize the amount of objects stored on the pallet, and to facilitate stability of the pallet, that is, to prevent objects from falling off the pallet when jarred or shaken.

Conventionally, palletizing apparatus utilize rollers energized from beneath by rubber belts to feed the objects to be palletized along the palletizer. However, when the objects to be palletized comprise packages of containers for beverages or the like, such as soda cans, the use of such rollers has been found extremely disadvantageous. Packages of soda cans or other like containers are formed by encasing the containers in a relatively thin cardboard package or enclosing the top of the containers in a plastic sheath. When such packaged containers are fed through a palletizer via rollers, damage to the containers and container packages caused by the gap between rollers often occurs, especially when high speed operation is desired. This results in extensive downtime and maintenance of the palletizer, as well as significant loss of product.

In addition, printed cardboard packaging contains waxes and inks, which may be transferred to the rollers by friction from the packages contacting the rollers. This can result in a build-up of waxes and inks on the rollers which can cause sliding of the packages on the rollers in a transverse direction (perpendicular to the desired direction of travel), leading to misalignment of container packages. Moreover, transverse sliding can cause the packages to strike the frame of the palletizer, potentially damaging the packages, the individual containers, and the palletizer. This results in significant downtime and product loss. Although it is possible to form rollers of a material resistant to build up of waxes and inks, such as polytetrafluoroethylene, commercially available as Teflon brand material, this has been found to be commercially unfeasible because of the costs involved.

These problems are not usually encountered when unpackaged containers are palletized, because of the hardness and non-marking of the bottom of such containers. However, when packaged containers are palletized, problems ensue. Because of these disadvantages, conventional palletizers do not handle packaged products with a desired efficiency, nor do they have the capability of handling diverse product lines.

It would be desirable to provide a palletizing apparatus which is capable of transporting container packages and loading them on a pallet in a desired pattern in a high speed fashion, while eliminating the downtime and product loss associated with the use of roller conveyors.

SUMMARY OF THE INVENTION

It is an object of the invention to provide a palletizing apparatus and method for loading container packages in a desired pattern on a pallet. It is another object of the invention to provide such an apparatus so as to permit the high speed stacking of container packages on a pallet with decreased downtime or other losses associated with conventional palletizers. It is yet another object of the invention to provide a palletizing apparatus and method which avoids the transverse sliding of container packages commonly encountered in conventional palletizers. It is still another object of the invention to provide a palletizing apparatus and method which provides better product handling and the capability to handle more diverse products.

These objects and others as set forth herein are provided by a palletizing apparatus for depositing container packages in a desired pattern on a pallet in accordance with the invention, generally comprising a series of palletizer sections uniquely combined in operative connection with each other which cooperate to avoid the problems which plague prior art palletizers. These palletizer sections include a metering conveyor section, a lane forming station, a first transfer station, a turning station, a second transfer station, a collection station, and a palletizing station. These separate stations cooperate to feed container packages through the palletizer, collect them in a desired pattern, and deposit the collected packages as a tier on a pallet.

The metering conveyor section of the inventive palletizing apparatus generally comprises a traveling endless belt which feeds container packages from a source, such as an apparatus which packages containers like beverage containers or the like, to a lane forming station. The belt is a roughtop belt, as would be familiar to the artisan, and travels at the speed the container packages will be fed through the palletizing apparatus. The rate of travel varies depending on the container packages to be palletized and the desired throughput. For instance, if the packages are "twelve-packs" (that is, they contain twelve containers), and are fed at 150 packages per minute, the belt will run at approximately 100 feet per minute, whereas if it is intended to operate the palletizing apparatus to provide 120 twenty-four container packages ("cases") per minute, the belt will run at approximately 158 feet per minute.

The lane forming station accepts the container packages from the metering conveyor section and separates the packages into individual lanes, which helps position the packages for downstream pattern forming. The lane forming station uses an electric eye system, timers and pneumatic valves and cylinders to distribute container packages to the proper lanes. From the lane forming station, the container packages, in their respective lanes, are fed across a first transfer station. The first transfer station uses a travelling endless woven wire belt which travels at approximately the same speed as the lane forming station to transfer the packages from the lane forming station to a turning station.

The turning station employs a turning conveyor which comprises a traveling endless plastic belt made up of individual modules shaped to provide longitudinally-oriented (i.e., oriented in the direction of travel) upper ribs, which convey the container packages along the conveyor. As the packages are conveyed along the turning station by the turning conveyor, they encounter turning means which are capable of turning each of the packages, within each of their respective lanes, by approximately 90°, in other words, by approximately ¼ turn. The turning station also contains bypass means to permit the container packages to pass through the turning station in their respective lanes without being turned. That is, the bypass means permit some or all of the container packages to bypass the turning means so they are not turned. The determination of which packages are turned and which are bypassed is one made based on the pattern desired, and is generally computer controlled. The turning conveyor is run such that it travels at approximately the same speed as the first transfer station belt and the lane forming station.

After exiting the turning station, the container packages are fed via a second transfer station, which uses an endless woven wire belt, to the collection station. The collection station includes a collection conveyor which uses a travelling endless plastic belt having individual modules shaped to provide longitudinally-oriented upper ribs to convey the container packages along the conveyor. The container packages are fed to the collection station in their respective lanes, with some of the packages turned by the turning means of the turning station. In this way, the collection station can collect the container packages in the desired pattern to be deposited on the pallet. To do this, the collection station utilizes a pair of side pushers, which are respectively disposed on either side of the collection conveyor such that movement of the side pushers towards each other forces the container packages closer to each other in the transverse direction ensuring greater consistency in pattern formation. The collection station also utilizes a stop bar which is moveable into position with respect to the collection conveyor, such that container packages contact the stop bar and are held as subsequent container packages collect behind the stop bar until a tier is complete. The action of the stop bar in combination with the side pushers collects the packaged containers in the desired pattern and readies them for loading on a pallet. The stop bar is also moveable up and away from the collection conveyor to release collected container packages as a tier for loading on a pallet.

From the collection conveyor, the collected container packages are fed across a "dead plate", which is a transfer station formed of a plate of metal or other like material. The dead plate slows the container packages being fed by the collection conveyor to facilitate loading on the pallet. After crossing the dead plate, the collected container packages are forced by a push bar onto a transfer plate. The push bar then remains in place behind the container packages as the transfer plate is retracted, which forms an opening which allows the tier of container packages to be deposited on the pallet. By remaining in place, the push bar acts as a stripper for the container packages as the transfer plate is retracted. The push bar then moves upstream, allowing clearance for the loaded pallet to lower.

This process is then repeated until the desired number of tiers are loaded on the pallet, which is then removed and a fresh pallet positioned in its place.

Other objects, aspects, and features of the present invention, in addition to those mentioned above, will be pointed out in, or will be understood from the following detailed description, provided in conjunction with the accompanying drawings.

DETAILED DESCRIPTION OF THE PREFERRED EMBODIMENT

Figure 1:
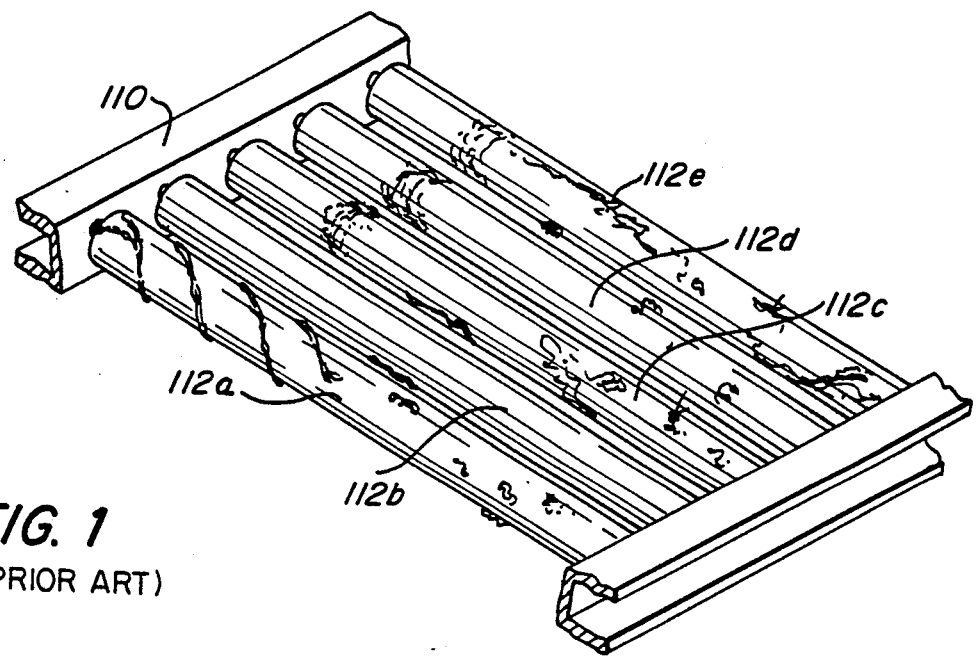
FIG. 1 is a perspective view of a roller conveyor of a prior art palletizing apparatus, showing a build up of waxes and inks from container packages conveyed thereby.

Referring now to FIGS. 1–15c, where like elements are identified by like numbers in the drawings, a palletizing apparatus is shown generally at 10, which is suited for providing container packages in a desired pattern to a pallet. For ease of description, not all reference characters are shown in each drawing figure.

Figure 2:
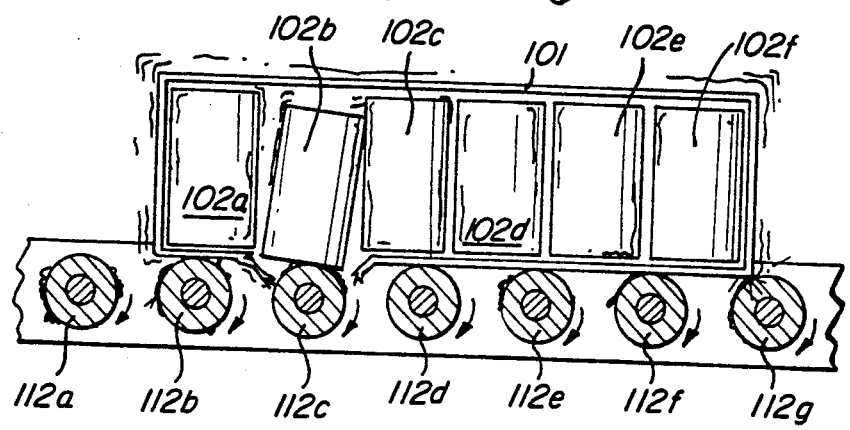
FIG. 2 is a cross-sectional side plan view of a roller conveyor of a prior art palletizing apparatus, showing a first type of container package conveyed therealong and the damage which can ensue thereby.
Figure 3:
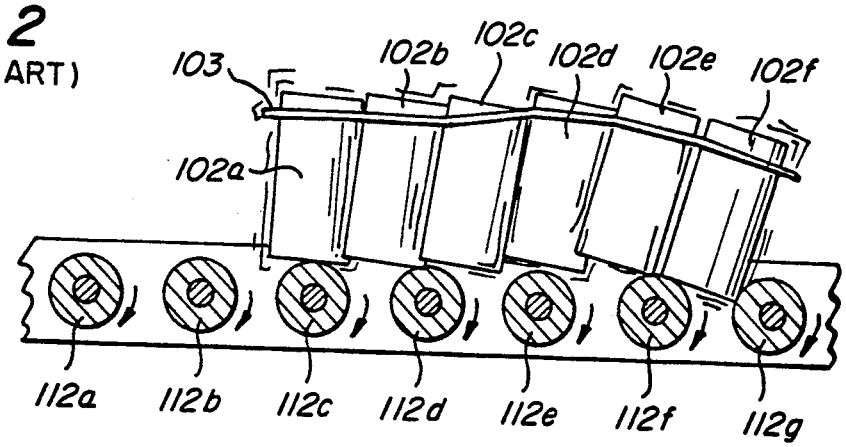
FIG. 3 is a side plan view of a roller conveyor of a prior art palletizing apparatus, showing a second type of container package conveyed therealong and the damage which can ensue thereby.

Referring to FIGS. 1, 2, and 3, prior art palletizers generally use a roller conveyor 110, which uses a plurality of rotating rollers 112a–112g to transport containers or container packages along conveyor 110. However, as illustrated in FIG. 1, rollers 112a et seq. can become slippery due to the build up of waxes and inks which have rubbed off container packages conveyed thereby. Because of this slipperiness, container packages can slide transversely (perpendicular to the direction of travel) which causes them to strike or fall off the conveyor or otherwise come out of alignment.

In addition, and referring now to FIG. 2, a container package 100 comprises a plurality of cans or containers 102a et seq. encased in a relatively thin cardboard packing 101. Because of the thinness of cardboard packing 101 and the gap between rollers 112a et seq., any of the individual cans or containers 102a et seq. can cause cardboard packing 101 to rupture, allowing a can or container to slip between two adjacent rollers, thereby jamming conveyor 110 and potentially rupturing and spilling the contents of the can or container on roller conveyor 110. In addition, rollers 112a et seq. can jostle or strike containers 102a et seq. to an extent where damage to the container occurs, without evidence of this damage on packaging 101. Alternatively, as illustrated in FIG. 3, containers 102a et seq. can be packaged by disposing a plastic sheath 103 about the upper ends of containers 102a et seq. When these containers are conveyed by roller conveyor 110, the loose packing of cans or containers 102a et seq. can also lead to one or more of the cans dropping in the gap between two adjacent rollers, causing conveyor 110 to jam or container contents to spill.

This problem becomes especially acute the higher the speed of operation of roller conveyor 110. Therefore, the use of rollers 112a et seq. for conveying container package 100 constitutes a limitation on the speed of operation of a palletizer and leads to extensive downtime and inefficiency.

Figure 4:
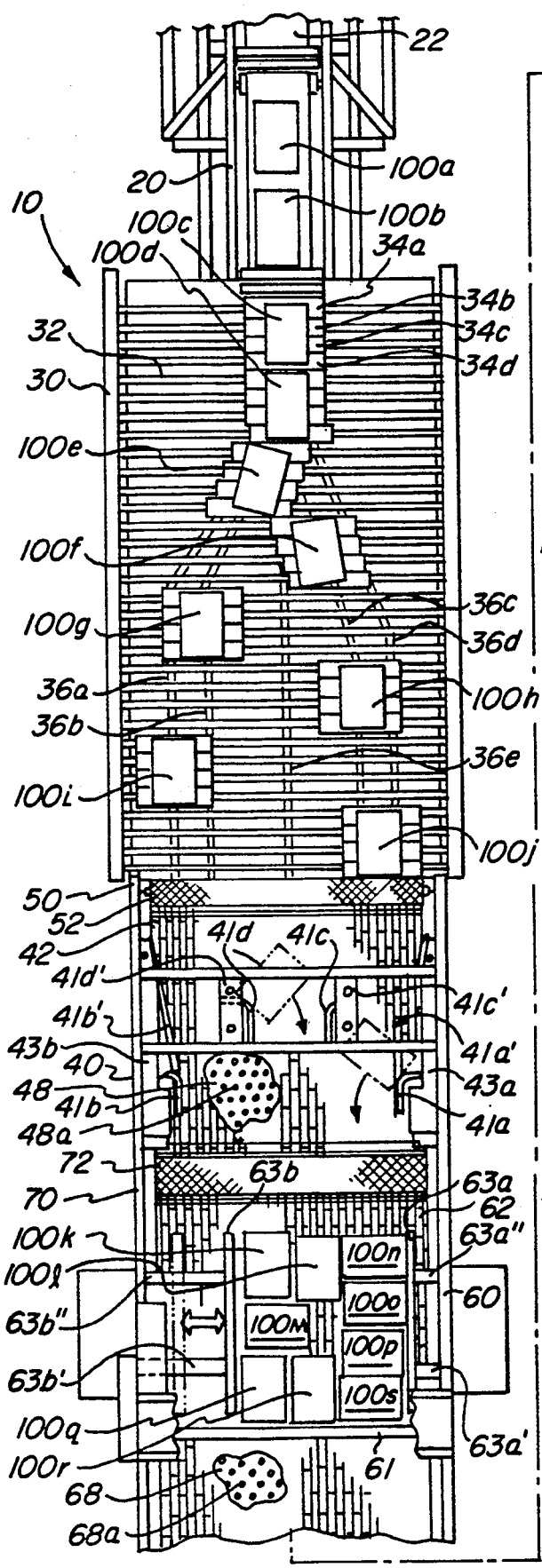
FIG. 4 is a partially broken away top plan view of a palletizing apparatus according to the present invention.
Figure 4:
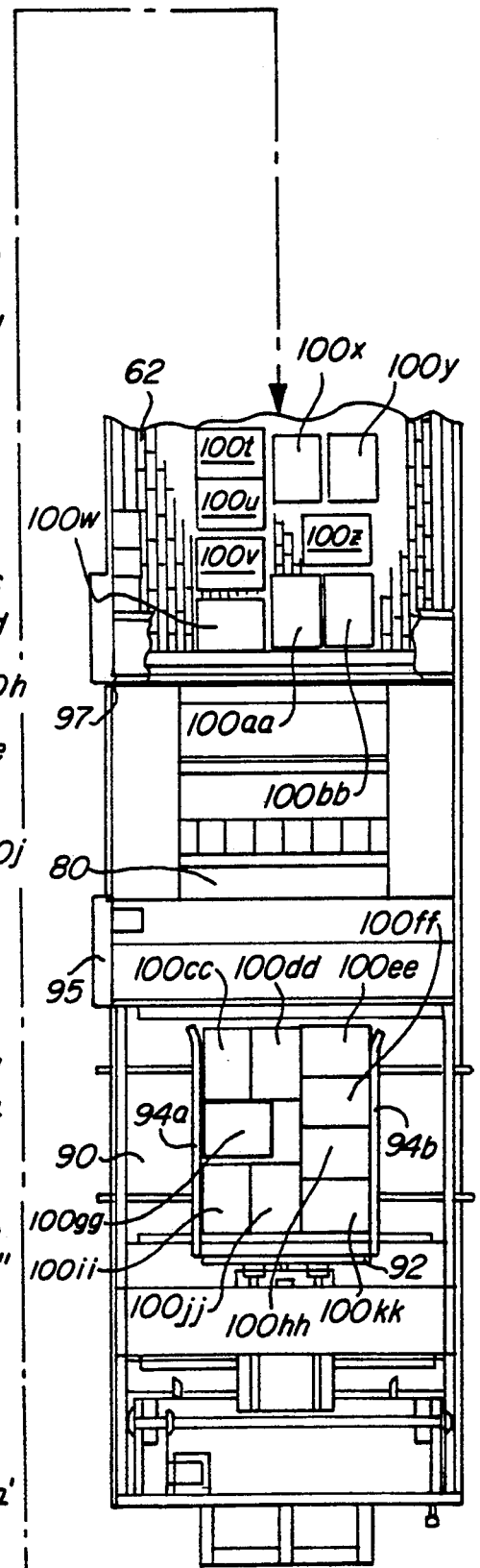

Referring now to FIG. 4, inventive palletizing apparatus 10 comprises a series of sections or elements in operative connection with each other. These elements include a metering conveyor section 20 which feeds container packages 100a et seq. to a lane forming station 30, which in turn feeds container packages 100a et seq. in individual lanes to a turning station 40 via a first transfer station 50. Container packages 100a et seq. are either turned by approximately 90° in their respective lanes, or allowed to proceed unturned through turning station 40, and are passed to collection station 60 via second transfer station 70. In collection station 60, container packages 100a et seq. are collected into a desired pattern and fed to a transfer plate 90 by a push bar 95 and deposited on a pallet (not shown) after transfer plate 90 is retracted.

Metering conveyor section 20 generally comprises a roughtop belt 22 which travels at the rate of speed at which container packages 100a et seq. will be fed through palletizing apparatus 10. Generally, the rate of travel of metering belt 22 will be between about 90 feet per minute (fpm) and about 170 fpm, depending on the container packages to be palletized. For instance, where container packages 100a et seq. are 8 inch long packs of containers (such as "12 packs" of beverage cans), to be fed at 150 packages per minute, metering belt 22 will run at approximately 100 fpm. Where container packages 100a et seq. are 16 inch long cases (such as cases of 24 beverage cans) to be run at 120 cases per minute, metering belt 22 will run at approximately 158 fpm. This rate of travel can be adjusted depending on the desired rate of throughput of palletizing apparatus 10 and the size of container packages 100a et seq. Metering belt 22 is driven via a controlled speed motor by frequency drive and gear arrangement (not shown), conventional in the art.

Metering belt 22 feeds container packages 100a et seq. to lane forming station 30 where container packages 100a et seq. are divided into individual lanes to facilitate forming the desired pattern for palletizing. Although the specific number of lanes into which container packages 100a et seq. are divided can be determined by the practitioner depending on the desired pattern, generally lane forming station 30 divides container packages 100a et seq. into five lanes. Two of these five lanes can be denoted as outside lanes, which respectively travel adjacent either side of lane forming station 30, two others can be denoted as inside lanes, which travel on the inside of lane forming station 30, between the outside lanes and the remaining lane can be denoted as a center lane, between both the two outside lanes and the two inside lanes.

Still referring to FIG. 4, lane forming station 30 utilizes an endless belt 32 made up of longitudinally-connected, transversely extending rods. In other words, belt 32 comprises a series of rods which extend from one side of lane forming station 30 to the other and are connected in the longitudinal (or direction of travel) direction such that belt 32 travels and transports container packages 100a et seq. in the longitudinal direction. Lane forming station 30 further comprises a plurality of slats 34a et seq., each of which is connected to at least one of the rods of belt 32. Most preferably, each of slats 34a et seq. is connected to adjoining rods of belt 32 in a slidable relationship thereto. In this way, each of slats 34a et seq. travel in the longitudinal direction in lane forming station 30, along with belt 32, yet are slidable in the transverse direction.

Lane forming station 30 also comprises a plurality of tracks 36a, 36b, 36c, 36d, and 36e arrayed beneath belt 32. Each of tracks 36a, 36b, 36c, 36d, and 36e correspond to one of the lanes in which lane forming station 30 separates container packages 100a et seq. for forming the desired pattern. Each of slats 34a et seq. is connected to one of tracks 36a, 36b, 36c, 36d, or 36e such that, as slats 34a et seq. travel along with belt 32, they slide in a transverse direction so as to travel immediately above the track 36a, 36b, 36c, 36d, or 36e to which they are respectively connected. Groups of slats 34a et seq. travel together to provide a surface large enough to carry one of container packages 100a et seq, as illustrated in FIG. 4. These groups of slats 34a et seq. travel in the individual lanes in which container packages 100a et seq. are to be divided. In this manner, container packages 100a et seq. are divided into their individual lanes for forming the desired pattern.

Figure 5:
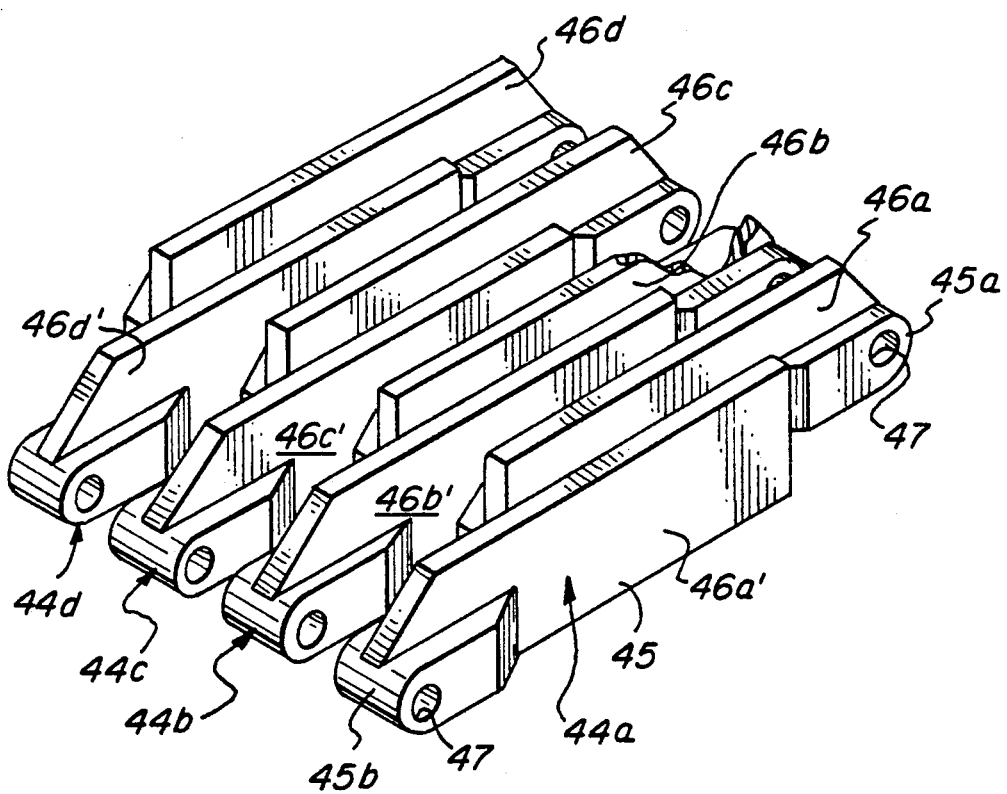
FIG. 5 is a partially broken away perspective view of the modules used to form both the turning conveyor and collection conveyor of the apparatus of FIG. 4.
Figure 15A:
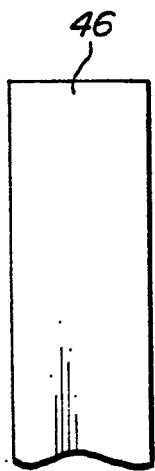
FIGS. 15a, 15b, and 15c are cross-sectional side plan views of different embodiments of the longitudinally-oriented upper ribs of the modules of both the turning conveyor and collection conveyor of the apparatus of FIG. 4.
Figure 15B:
Figure 15C:
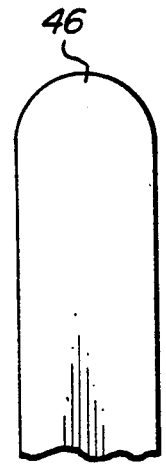

From lane forming station 30, container packages 100a et seq. are fed to turning station 40, where some or all of container packages 100a et seq. are turned to form the desired pattern. In order to avoid the need for use of a roller conveyor, turning station 40 comprises a turning conveyor 42 which comprises a traveling endless plastic belt made up of individual modules 44a et seq., each of which is shaped to provide at least one longitudinally (direction of travel) oriented upper rib 46a et seq. on which container packages 100a et seq. ride, as illustrated in FIG. 5. As illustrated in FIGS. 15a-15c, upper ribs 46a et seq. can assume various cross-sectional shapes, including rounded, squared, or other upper surface shape.

Figure 9:
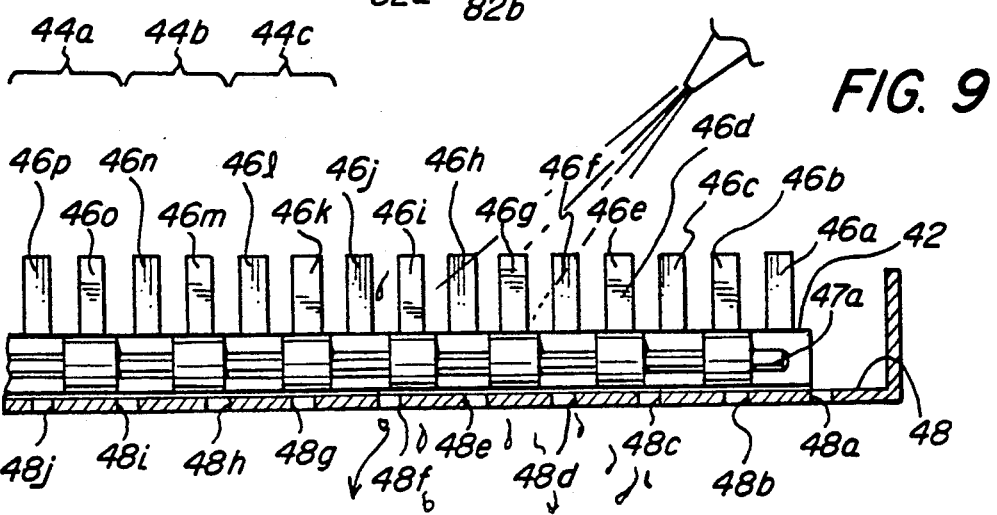
FIG. 9 is a partial cross-sectional side plan view of the apparatus of FIG. 4 illustrating the cleaning thereof.

The individual modules 44a et seq. of turning conveyor 42 are transversely aligned to form links of conveyor 42. They each comprise a body 45 having a front end 45a and a rear end 45b, each having a receiving means 47 for receiving an elongate connection piece 47a, as illustrated in FIG. 9, which connects the modules 44a et seq. to form a link of conveyor 42. Generally, each module 44 comprises two longitudinally-oriented ribs 46a and 46a' extending therefrom, where one of ribs 46a and 46a' is disposed so as to be adjacent front end 45a of body 45 and the other is disposed so as to be adjacent rear end 45b of module body 45. In addition, forward ends 46a of modules 44a et seq. and rear ends 45b of modules 44a et seq. are spaced apart such that the ends of following modules can intertwine and fit together and thereby be connected by a single elongate piece 47a such as a rod to form the links of conveyor 42.

Other suitable modules which can be connected to form conveyor 42 having longitudinally oriented upper ribs 46a et seq. are described in, for instance, Bailey and Spangler in U.S. Pat. No. 4,893,710 and Lapeyre in U.S. Pat. No. 4,051,949, the disclosures of each of which are incorporated herein by reference.

Figure 6:
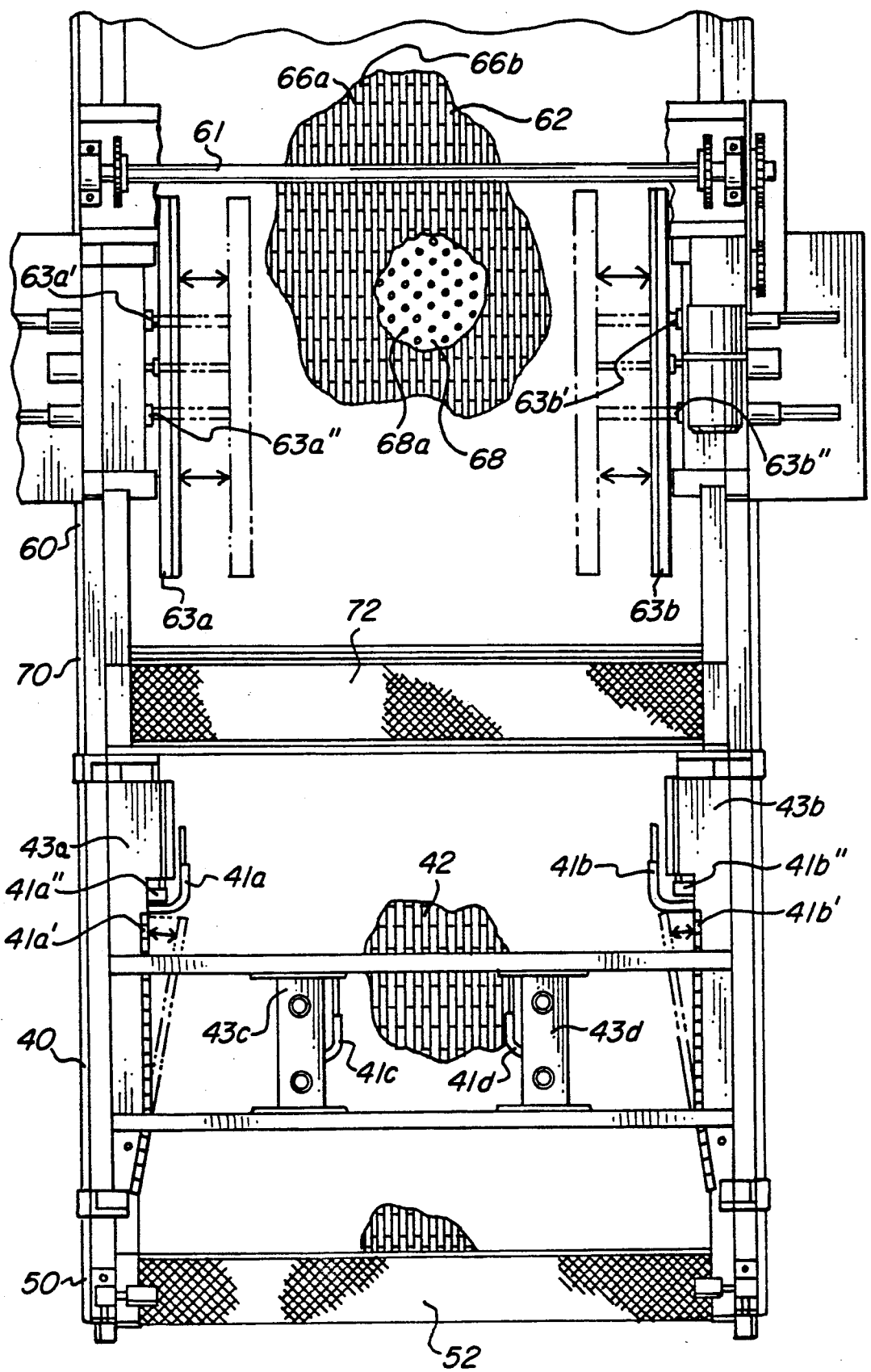
FIG. 6 is a partially broken away top plan view of the first transfer station, turning station, second transfer station and collection station of the apparatus of FIG. 4.
Figure 7:
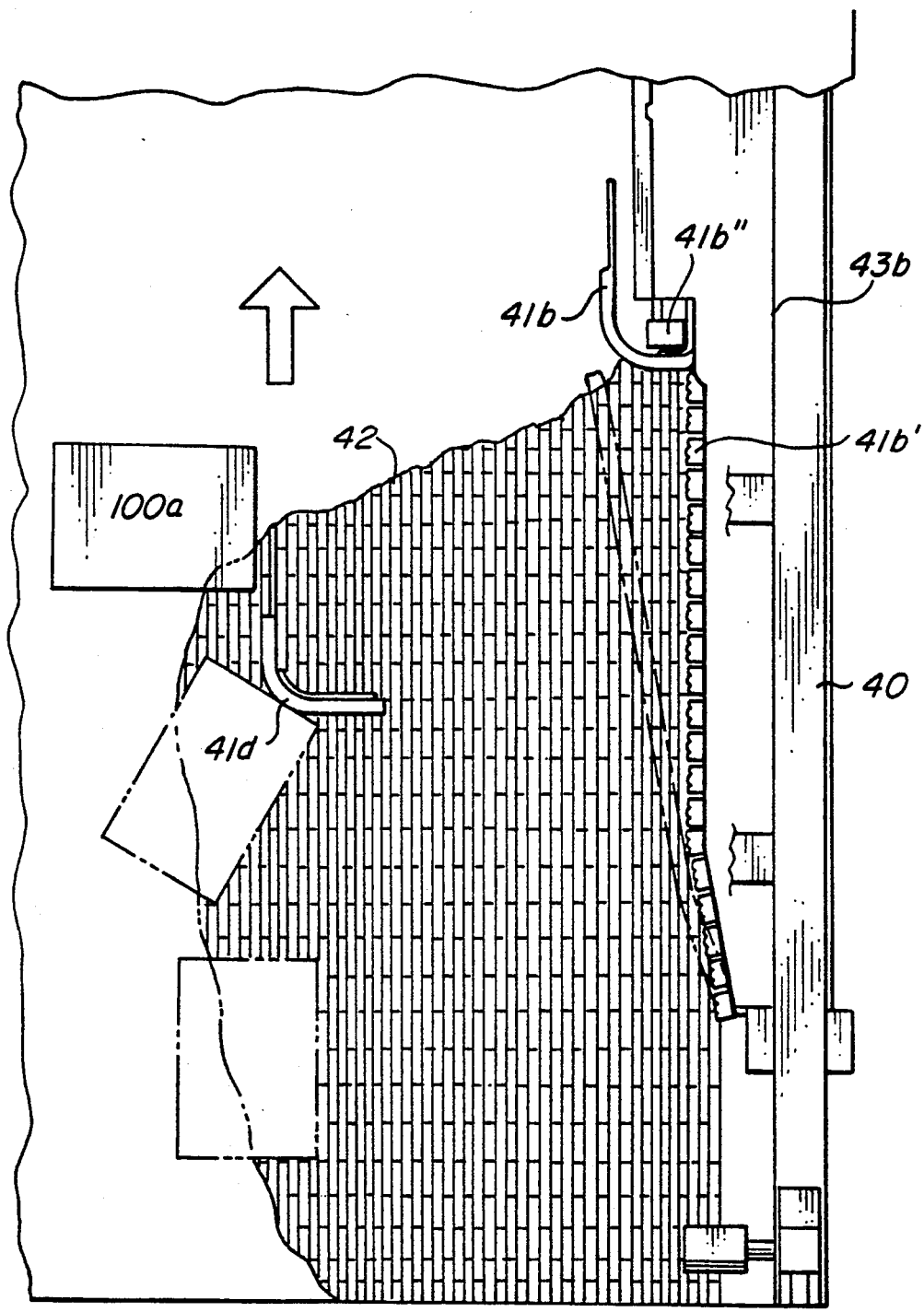
FIG. 7 is a partially broken away top plan view of the turning station of the apparatus of FIG. 4, showing the turning of a container package by a center turner.

Referring now to FIGS. 6 and 9, turning conveyor 42 rides on a perforated plate 48. Generally, perforated plate 48 contains perforations 48a et seq. which permit belt 42 to be washed easily by spraying water or other solvent thereacross, which then drips through plate perforations 48a et seq. for disposal as illustrated in FIG. 9. This provides a significant advantage over roller conveyors which cannot be cleaned with the same degree of ease. Although the distribution of perforations 48a et seq. is not critical, they generally are arrayed in rows of three which proceed diagonally across plate 48 with approximately six holes in a row. The actual deployment of perforations 48a et seq. in plate 48 is within the skill of the artisan.

By the use of conveyor 42 having ribs 46a et seq. on which container packages 100a et seq. ride, transverse sliding of container packages 100a et seq. is avoided. This is both because the longitudinal orientation of ribs 46a et seq. prevents such sliding and also because the shape and other characteristics of ribs 46a et seq. prevents buildup of waxes and inks. In addition, the use of ribs 46a et seq., which sit closely together as illustrated in FIGS. 4, 5, and 6, prevents containers from container packages 100a et seq. from falling in the gaps therebetween and jamming.

Referring now to FIGS. 4, 6, 7, and 8, turning station 40 comprises turners 41a, 41b, 41c, and 41d. Each of turners 41a and 41b are denoted side turners, that is, they turn container packages 100a et seq. which are traveling in the outside lanes arrayed along the sides of conveyor 42. Most often, center turners 41c and 41d turn only container packages 100a et seq. traveling along the center lane, but this can vary depending on the positioning of center turners 41c and 41d, and the pattern desired. Turners 41c and 41d are denoted center turners, because they turn container packages 100a et seq. which travel along the inside or center lanes of conveyor 42. Each of side turners 41a and 41b comprise radial members which extend from a side frame 43a and 43b of turning station 40 such that container packages 100a et seq. traveling down the outside lanes of conveyor 42 strike side turners 41a and 41b and are thereby turned approximately 90°, or ¼ of a revolution. Center turners 41c and 41d operate in the same manner except they are disposed in the path of container packages 100a et seq. by depending from upper frames 43c and 43d, respectively, of turning station 40. As container packages 100a et seq. travel down the inside or center lanes along conveyor 42, they impact center turners 41c or 41d and are turned approximately 90° or ¼ revolution.

Because the desired pattern for package containers 100a et seq. (illustrated for example in FIG. 4) may require package containers 100a et seq. to be turned at times, and to not be turned at times, in each of the respective lanes, turning station 40 also contains means for bypassing each of turners 41a, 41b, 41c, and 41d. In order to bypass side turners 41a and 41b, turning station 40 comprises side guides, 41a' and 41b'. Each of side guides 41a' and 41b' lie against sides 43a and 43b, respectively, when inactive. However, when it is desired that side turners 41a and 41b be bypassed, guides 41a' and 41b' extend out, permitting packaged containers 100a to slide along guides 41a' and 41b' and thereby avoid impact and turning on side turners 41a and 41b.

Figure 8:
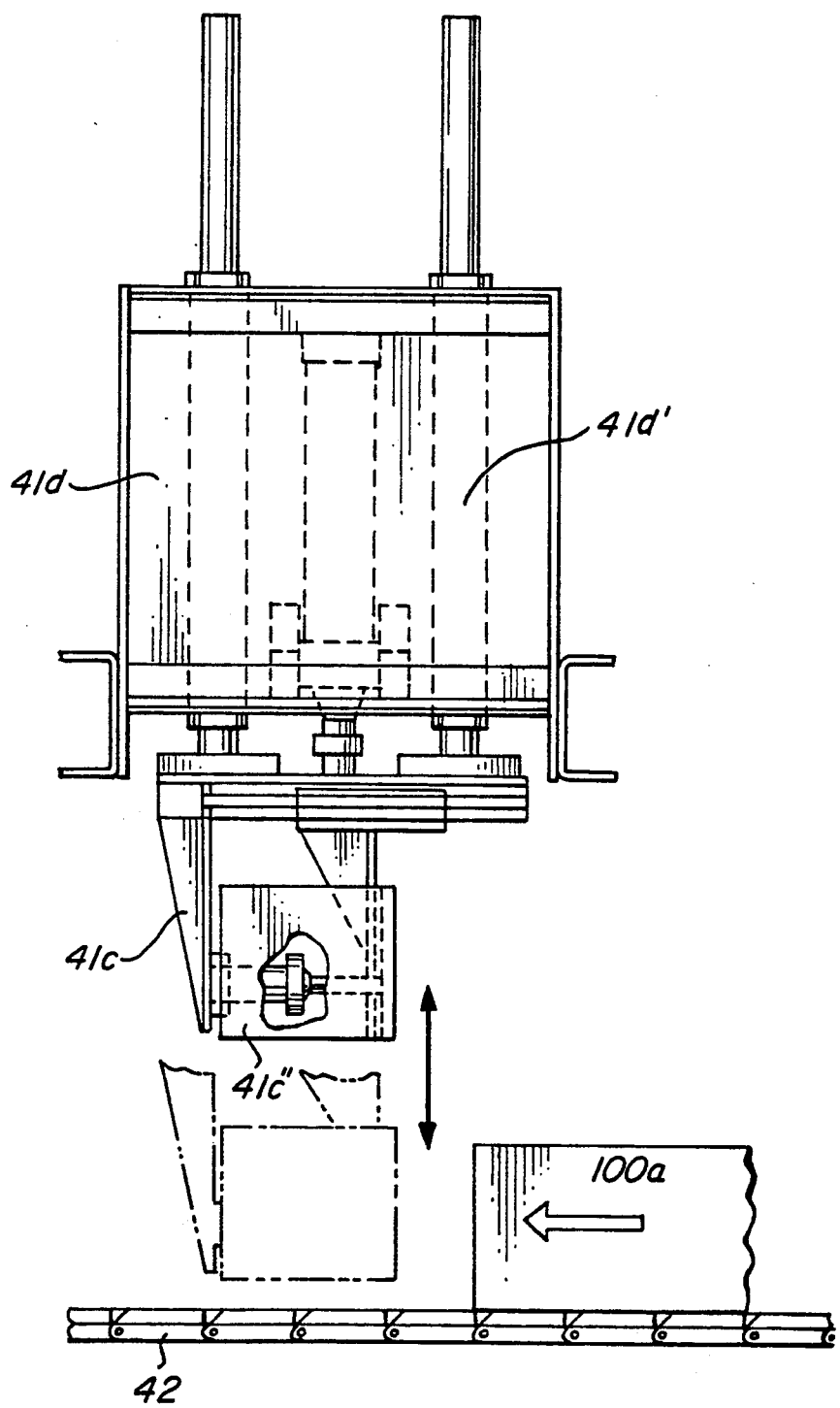
FIG. 8 is a partial, cross-sectional side plan view of the turning station of the apparatus of FIG. 4, showing the turning of a container package by a center turner.

In order to bypass center turners 41c and 41d, and referring now to FIG. 8, each of center turners 41c and 41d, can be raised up towards frames 43c and 43d by retracting apparatus 41c' and 41d'. In this way, when retracting apparatus 41c' and 41d' retract center turners 41c and 41d, center turners 41c and 41d are no longer in the path of container packages 100a et seq. which are thereby not turned and proceed in their original orientation along conveyor 42.

In order to prevent jarring or other damage caused by container packages 100a et seq. striking turners 41a, 41b, 41c, and 41d, turners 41a, 41b, 41c, and 41d may be fitted with a cushioning or shock absorbing mechanism 41a'', 41b'', 41c'', and 41d'', such as a regulator and an accumulator, as familiar to the skilled artisan, such that when container packages 100a et seq. strike turners 41a, 41b, 41c, and 41d, damage is avoided.

Referring now to FIG. 6, after container packages 100a et seq. have either been turned or allowed to pass through turning section 40 without turning, they are transferred to collection station 60, where package containers 100a et seq. are collected into a tier for loading on a pallet. Collection station 60 comprises an endless belt 62 which comprises individual modules shaped to provide longitudinally oriented upper ribs upon which conveyor packages 100a et seq. ride. Both turning belt 42 and collection belt 62 are formed from modules 44a et seq. described above. Hence, collection belt 62 will not be described independently. Rather, refer to the description of belt 42 for an adequate description of belt 62, which comprises corresponding elements 64a et seq., 65a et seq., 66a et seq., and 67a et seq. In addition, collection belt 62 rides on plate 68 containing perforations 68a et seq., which permit easy cleaning. As was the case with turning conveyor 42, the longitudinally oriented upper ribs 66a et seq. of collection belt 62 prevent transverse sliding of container packages 100a et seq. and also avoid jamming of palletizing apparatus 10 by container packages 100a et seq. becoming jammed between rollers.

Collection station 60 further comprises side pushers 63a and 63b, each of which can be retracted or extended from a side frame 60a and 60b of collection station 60 via guide rods 63a', 63a'', 63b', and 63b''. When side pushers 63a and 63b are extended from side frames 60a and 60b, they force container packages 100a et seq., whether turned or not, into a closer relationship with each other. In addition, collection station 60 comprises stop bar 61 which is moveable into position with respect to conveyor 62, such that container packages 100a et seq. impact stop bar 61 and are collected there with subsequent container packages 100a et seq. collecting behind leading container packages.

Figure 13:
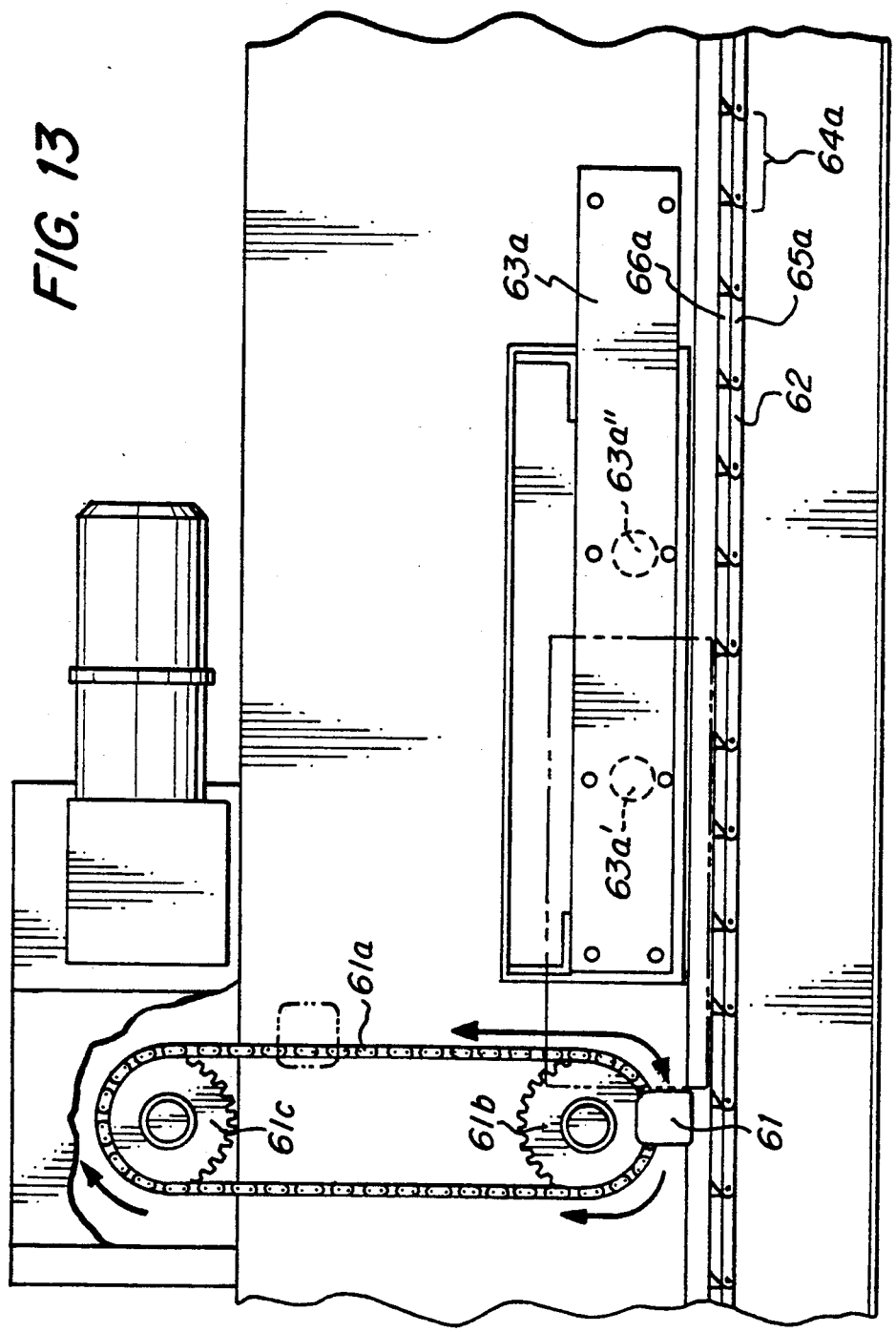
FIG. 13 is a partially broken away side plan view of the collection conveyor of the apparatus of FIG. 4.

The action of stop bar 61 in coordination with side pushers 63a and 63b serves to collect container packages 100a et seq. into a single tier in a desired pattern (due to the action of turning station 40) for loading on a pallet as illustrated in FIG. 4. Referring now to FIG. 13, stop bar 61 is an elongate bar which can be moved towards and away from conveyor 62 by chain 61a on which stop bar 61 is mounted. Chain 61a travels between sprockets 61b and 61c at a rate set to place stop bar 61 in a position to stop container packages 100a et seq. such that individual tiers of container packages 100a et seq. are collected. Once the tier is collected, stop bar 61 moves away from conveyor 62 permitting the individual tier of container packages 100a et seq. to be conveyed out of collection station 60, after which stop bar 61 moves back into position to catch and collect the oncoming tier.

In transferring container packages 100a et seq. from lane forming station 30 to turning station 40, and then again from turning station 40 to collection station 60, container packages 100a et seq. travel across a first transfer station 50 (between lane forming station 30 and turning station 40), and a second transfer station 70 (between turning station 40 and collection station 60). Each of first transfer station 50 and second transfer station 70 comprise a traveling endless woven wire mesh belt 52 and 72 respectively which serve to impart continuous forward (longitudinal) motion to container packages 100a et seq. to facilitate the transfer between lane forming station 30 and turning station 40, and turning station 40 and collection station 60, respectively.

Figure 10:
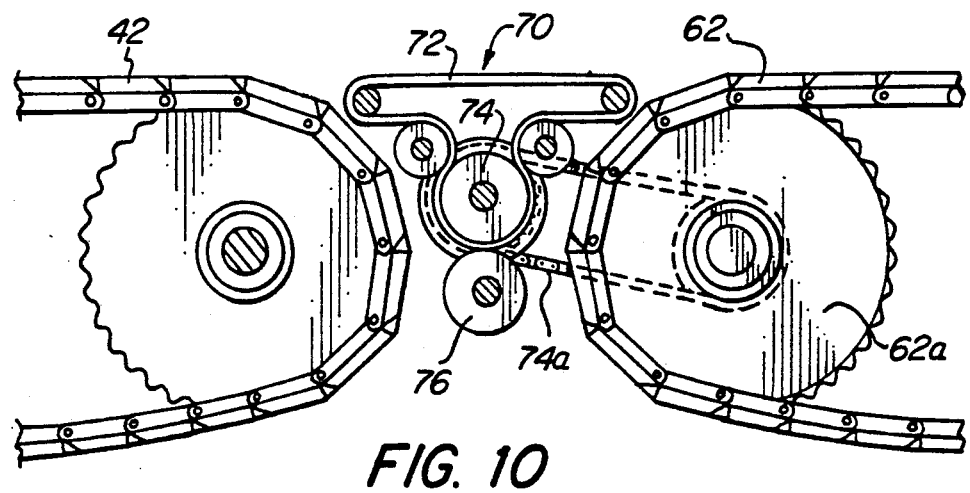
FIG. 10 is a partial, cross-sectional side plan view of the turning conveyor, second transfer station, and collection conveyor of the apparatus of FIG. 4.

First transfer station 50 and second transfer station 70 will be described in more detail by reference to FIG. 10, which illustrates second transfer station 70. Since first transfer station 50 and second transfer station 70 are substantial duplicates of each other, only transfer station 70 will be illustrated.

Second transfer station 70 comprises, as noted above, a traveling endless woven wire mesh belt 72 which travels between a drive roller 74 and a nip roller 76. Drive roller 74 is driven by a motor (not shown) and the friction created between drive roller 74, nip roller 76, and belt 72 therebetween causes belt 72 to travel. In a preferred embodiment, and as also illustrated in FIG. 10, drive roller 74 is driven off sprocket 62a which drives collection conveyor 62 by chain 74a. In this way, it can be ensured that second transfer section 70 belt 72 is driven at the same speed as collection conveyor 62 to ensure uniform transfer. Likewise, first conveyor section 50 comprises belt 52, drive roller 54, and nip roller 56, with drive roller 54 run by chain 54a to sprocket 42a which drives turning station belt 42.

By linking lane forming station 30, turning station 40, and collection station 60 by first and second transfer stations 50 and 70, transfer is facilitated because the wire mesh used to form belts 52 and 72 has a much smaller pitch length than conveyors 42 and 62, such that the belts more seamlessly abut, facilitating transfer especially when compared with prior art palletizers. In addition, belts 52 and 72 avoid the bouncing of container packages 100a et seq. experienced when conventional transfer rollers are employed.

Figure 12:
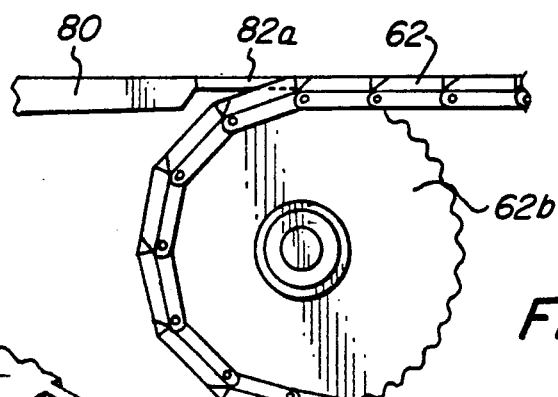
FIG. 12 is a partially broken away cross-sectional side plan view of the dead plate and collection conveyor of the apparatus of FIG. 4.
Figure 11:
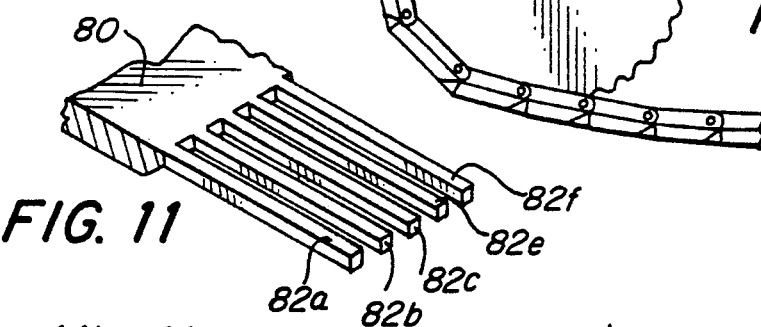
FIG. 11 is a partially broken away perspective cross-sectional view of the dead plate of the apparatus of FIG. 4.
Figure 14:
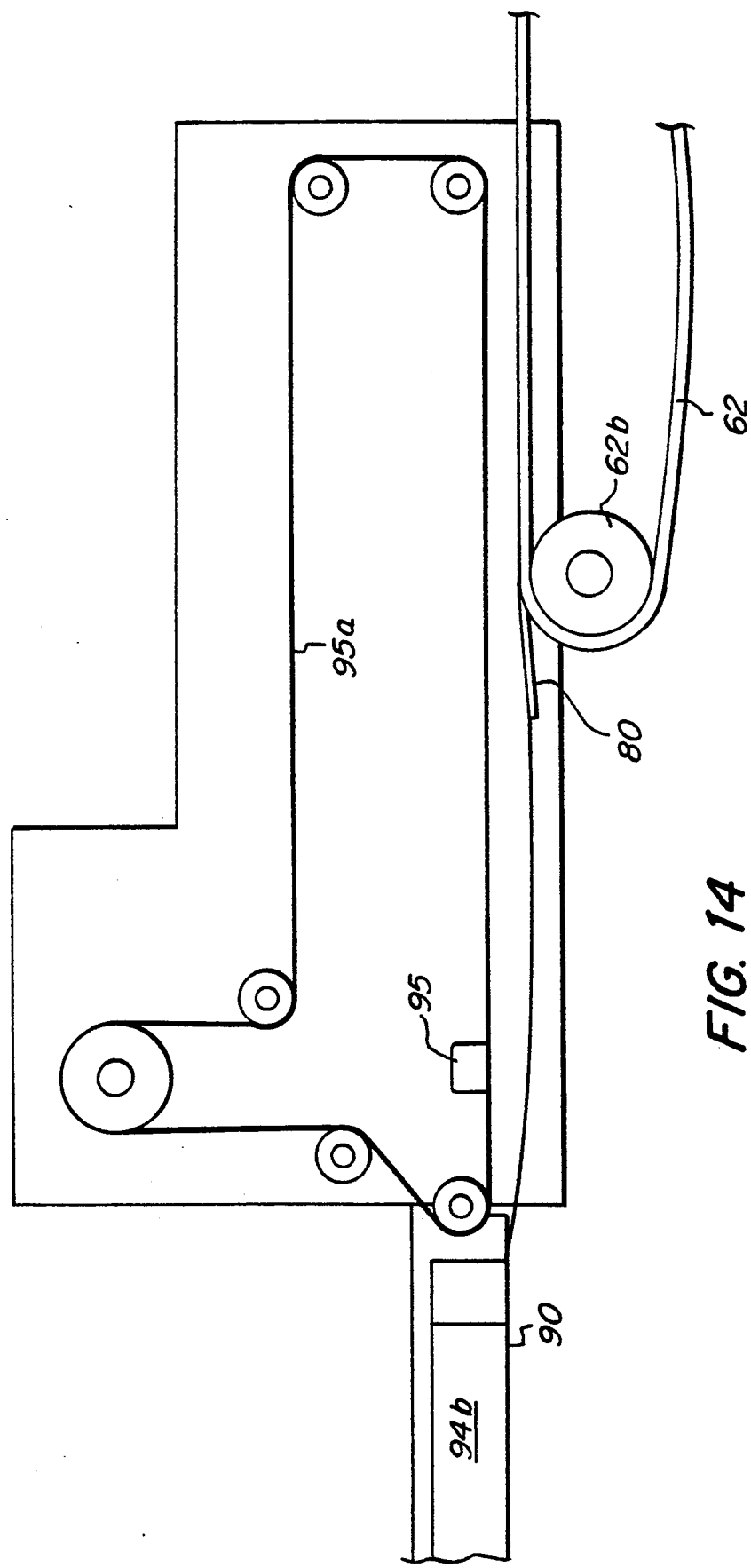
FIG. 14 is a partial cross-sectional side plan view of the transfer plate, pusher bar mechanism and collection conveyor of the apparatus of FIG. 4.

In exiting collection section 60, after having been released by stop bar 61, collected container packages 100a et seq. are conveyed by conveyor 62 across a dead plate 80 to a transfer plate 90 from which container packages 100a et seq. are deposited onto a pallet (not shown). Referring now to FIGS. 11 and 12, dead plate 80 comprises a stationary plate having radial combs or ties 82a et seq. which permit more seamless transfer of container packages 100a et seq. from conveyor 62 to dead plate 80. From dead plate 80 container packages 100a et seq. are pushed onto transfer plate 90 which lies over the pallet on which they are to be deposited. The collected container packages 100a et seq. are pushed onto transfer plate 90 by pusher bar 95 which runs along cable 95a, which remains in place behind collected container packages 100a et seq., as shown in FIG. 14, as transfer plate 90 is retracted. In this way, pusher bar 95 strips collected container packages 100a et seq. from transfer plate 90 and onto the pallet lying underneath. In order to maintain collected container packages 100a et seq. in position, as they are pushed by pusher bar 95 they contact a first bumper 92 and two side bumpers 94a and 94b which maintain collected container packages 100a et seq. in position for depositing on a pallet.

Optionally, as illustrated in FIG. 4, before collected container packages 100a et seq. are passed to dead plate 80, they encounter a second stop bar 97 disposed immediately prior to dead plate 80 in order to maintain them in position and ensure that transfer plate 90 is ready and in position for receiving collected container packages 100a et seq. Stop bar 97 functions in the same manner as stop bar 61.

A method for palletizing container packages in a desired pattern on a pallet in accordance with the invention generally follows the operation of palletizing apparatus 10 discussed above, and involves feeding container packages from a metering conveyor 20 to a lane forming station 30 where they are separated into a plurality of individual lanes. The container packages are then fed in their lanes from lane forming station 30 to a turning station 40 where they ride on a plastic mesh belt having longitudinally oriented raised ribs to avoid jamming or transverse sliding. In turning station 40 some or all of the container packages are turned and then fed to a collection station where they again are conveyed by an endless plastic mesh belt having longitudinally oriented raised ribs, where they are collected into the desired pattern by a stop bar and a pair of side pushers. The collected container packages are then fed across a dead plate 80 onto a transfer plate 90 by a pusher bar 95. As transfer plate 90 is retracted, pusher bar 95 strips collected container packages 100a et seq. from transfer plate 90 onto a pallet.

The present invention, therefore, provides a new and useful apparatus and method for palletizing container packages in a desired pattern on a pallet by combining a series of disparate elements which cooperate to avoid the disadvantages of prior art palletizers.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A palletizer for providing container packages in a desired pattern to a pallet, comprising
   a) a metering conveyor section which comprises a traveling endless belt which feeds container packages to a lane forming station;

b) said lane forming station comprising a lane divider which accepts container packages from said metering conveyor section and separates the container packages such that they are fed to a turning station in a plurality of lanes;

c) a first transfer station comprising a traveling endless woven wire belt which transfers the container packages in their lanes from said lane forming station to said turning station;

d) said turning station comprising
   i) a turning conveyor comprising a traveling endless plastic belt which comprises links formed of transversely aligned individual modules, said modules each comprising a body having a front end and a rear end, wherein each of said modules comprises two longitudinally oriented ribs extending from said module body, each of said ribs having a forward end and a rearward end, wherein the forward end of one of said ribs is disposed adjacent the front end of said body while the rearward end is disposed away from the rear end of said body, whereas the rearward end of the other of said ribs is disposed adjacent the rear end of said body while the forward end is disposed away from the front end of said body;
   ii) means associated with said turning conveyor for turning conveyor packages in each of said lanes by approximately 90°, wherein said turning means comprise side turners and center turners, said side turners comprising radial members extending from the sides of said turning station where they are struck by the container packages which are thereby turned, said center turners comprising radial members extending into the paths of container packages where they are struck by the container packages which are thereby turned; and
   iii) means for bypassing each of said turning means such that the container packages are fed through said turning conveyor without having been turned;

e) a second transfer station comprising a traveling endless woven wire belt which transfers the container packages from said turning station to a collection station;

f) said collection station comprising
   i) a collection conveyor comprising a traveling endless plastic belt which comprises links formed of transversely aligned individual modules, said modules each comprising a body having a front end and a rear end, wherein each of said modules comprises two longitudinally oriented ribs extending from said module body, each of said ribs having a forward end and a rearward end, wherein the forward end of one of said ribs is disposed adjacent the front end of said body while the rearward end is disposed away from the rear end of said body, whereas the rearward end of the other of said ribs is disposed adjacent the rear end of said body while the forward end is disposed away from the front end of said body;
   ii) side pushers which extend from sides of said collection station, to push the container packages into a closer relationship; and
   iii) a stop bar moveable into a position to stop the container packages and collect them in said collection station, and moveable out of said stop position to permit the collected container packages to be conveyed further, and g) means for transferring the collected container packages to a pallet.

2. A palletizer according to claim 1, wherein said metering conveyor section comprises a rough-top belt which can be adjusted to travel at a rate which can vary between about 90 feet per minute and about 170 feet per minute.

3. A palletizer according to claim 2, wherein said lane forming station comprises
   a) an endless belt of longitudinally connected, transversely-extending rods;
   b) a plurality of slats, each of which is connected to adjoining rods and each of which is slidable in the transverse direction;
   c) a plurality of tracks arrayed beneath said belt of transversely-extending rods, each of said tracks corresponding to one of the lanes in which the container packages are fed to said turning station, where groups of said slats are connected to one of said tracks, the groups of slats sized to permit one of the container packages to be carried thereon, wherein container packages are fed from said metering, conveyor section onto groups of said slats of said lane forming station and into individual lanes by the connection of the groups of said slats with said tracks.

4. A palletizer according to claim 3, wherein said lane forming station comprises four of said tracks, each of which corresponds to a lane in which container packages can be fed to said turning station, two of said tracks and lanes running adjacent the outside of said endless belt of longitudinally connected, transversely-extending rods, and two of said tracks and lanes running between said outside tracks and lanes.

5. A palletizer according to claim 3, wherein said first transfer station belt, said lane forming station belt, and said turning conveyor each travel at approximately the same rate.

6. A palletizer according to claim 1, wherein said bypassing means for said side turners comprise guides which extend into the paths of container packages to divert container packages away from said side turners, and said bypassing means for said center turners comprise means for raising said center turners out of the paths of the container packages.

7. A palletizer according to claim 1, wherein said second transfer station belt is driven by the action of a drive roller which is driven by a motor, and a nip roller, wherein said second transfer station belt travels between said drive roller and said nip roller, and friction between said drive roller and said nip roller and said second transfer station belt causes said first transfer station belt to travel.

8. A palletizer according to claim 1, wherein said second transfer station belt and said collection conveyor belt each travel at approximately the same rate.

9. A palletizer according to claim 1, wherein said first transfer station belt is driven by the action of a drive roller which is driven by a motor, and a nip roller, wherein said first transfer station belt travels between said drive roller and said nip roller, and friction between said drive roller and said nip roller and said first transfer station belt causes said first transfer station belt to travel.

10. A palletizer for providing container packages in a desired pattern to a pallet comprising a) a metering conveyor section which comprises a traveling endless belt which feeds container packages to a lane forming station;

b) said lane forming station comprising a lane divider which accepts container packages from said metering conveyor section and separates the container packages such that they are fed to a turning station in a plurality of lanes;

c) a first transfer station comprising a traveling endless woven wire belt which transfers the container packages in their lanes in said lane forming station to said turning station;

d) said turning station comprising
  i) a turning conveyor comprising a traveling endless plastic belt comprising individual modules shaped to provide longitudinally oriented upper ribs, which conveys container packages in lanes therealong;
  ii) turning means associated with said turning conveyor for turning container packages in each of said lanes by approximately 90°; and
  iii) bypassing means for bypassing said turning means such that the container packages are fed through said turning conveyor without having been turned;

e) a second transfer station comprising an endless woven wire belt which transfers the container packages from said turning station to a collection station;

f) said collection station comprising
  i) a collection conveyor comprising a traveling endless plastic belt comprising individual modules shaped to provide longitudinal oriented upper ribs which conveys said container packages therealong;
  ii) a pair of side pushers, one disposed on either side of said collection conveyor such tat movement of said side pushers towards each other forces the container packages closer to each other in the transverse direction with respect to the direction of travel of said collection conveyor;
  iii) a stop bar associated with said collection conveyor, wherein said stop bar is moveable into a position with respect to said collection conveyor such that leading container packages strike said stop bar and subsequent container packages strike the leading container packages and collect against said stop bar, and wherein said stop bar is moveable away from said collection conveyor to permit the collected container packages to pass thereunder; and g) means for transferring the collected container packages to a pallet 11. A palletizer according to claim 10, wherein said metering conveyor section comprises a rough-top belt which can be adjusted to travel at a rate which can vary between about 90 feet per minute and about 170 feet per minute.

12. A palletizer according to claim 10, wherein said lane divider comprises
  a) an endless belt of longitudinally connected, transversely-extending rods;
  b) a plurality of slats, each of which is connected to adjusting rods and each of which is slidable in the transverse direction;
  c) a plurality of tracks arrayed beneath said belt of transversely-extending rods, each of said tracks corresponding to one of the lanes in which the container packages are fed to said turning station, wherein groups of said slats are connected to one of said tracks, the groups of slats sized to permit one of the container packages to be carried thereon, wherein container packages are fed from said metering conveyor section onto groups of said slats of said lane divider and into individual lanes by the connection of the groups of said slats with said tracks.

13. A palletizer according to claim 12, wherein said lane divider comprises four of said tracks, each of which corresponds to a lane in which container packages can be fed to said turning station, two of said tracks and lanes comprising side tracks and lanes running adjacent the outside of said endless belt of longitudinally connected, transversely-extending rods, and two of said tracks and lanes comprising center tracks and lanes running between said outside tracks and lanes.

14. A palletizer according to claim 12, wherein said first transfer station belt, said lane divider belt, and said turning station conveyor each travel at approximately the same rate.

15. A palletizer according to claim 14, wherein said first transfer station belt is driven by the action of a drive roller which is driven by a motor, and a nip roller, wherein said first transfer station belt travels between said drive roller and said nip roller and friction between said driver roller and said nip roller and said first transfer station belt causes said first transfer station belt to travel.

16. A palletizer according to claim 10, wherein said endless plastic belt of said turning conveyor and of said collection conveyor each comprise links formed of transversely aligned individual modules, said modules each comprising a body having a front and a rear end, wherein each of said modules comprises two longitudinally oriented ribs extending from said module body, each of said ribs having a forward end and a rearward end, wherein the forward end of one of said ribs is disposed adjacent the front end of said body while the rearward end is disposed away from the rear end of said body, whereas the rearward end of the second of said ribs is disposed adjacent the rear end of said body while the forward end is disposed away from the front end of said body.

17. A palletizer according to claim 15, wherein said turning conveyor belt is driven by a sprocket which is driven by the same motor which drives said first transfer station belt drive roller.

18. A palletizer according to claim 13, said turning means comprising side turners and center turners, said side turners comprising radial members extending from the sides of said palletizer where they are struck by the container packages which are thereby turned, said center turners comprising radial members extending into the paths of said container packages where they are struck by the container packages which are thereby turned.

19. A palletizer according to claim 18, wherein said bypassing means for said side turners comprise rods which extend into said side lanes to divert container packages away from said side turners, and said bypassing means for said center turners comprise means for raising said center turners out of the paths of the container packages.

20. A palletizer according to claim 10, wherein said second transfer station belt is driven by the action of a drive roller which is driven by a motor, and a nip roller, wherein said second transfer station belt travels between said drive rollerand said nip roller and friction between said drive roller and said nip roller and said second transfer station belt causes said second transfer station belt to travel.

21. A palletizer according to claim 20, wherein said second transfer station belt and said collection conveyor belt each travel at approximately the same rate.

* * * * *